United States Patent [19]

Montgomery et al.

[11] Patent Number: 4,797,544
[45] Date of Patent: Jan. 10, 1989

[54] OPTICAL SCANNER INCLUDING POSITION SENSORS

[76] Inventors: James R. Montgomery, 211 Durham St., Menlo Park, Calif. 94025; John A. Figueroa, P.O. Box 160, Mountain View, Calif. 94042; George White, 25785 Bassett La., Los Altos Hills, Calif. 94022

[21] Appl. No.: 889,130
[22] Filed: Jul. 23, 1986
[51] Int. Cl.[4] .............................................. G01V 9/04
[52] U.S. Cl. .................................... 250/221; 358/293; 382/59
[58] Field of Search ............... 358/294, 293; 250/221, 250/578; 340/710, 709; 235/472; 382/59

[56] References Cited

U.S. PATENT DOCUMENTS

| | | | |
|---|---|---|---|
| 4,581,657 | 4/1986 | Takano | 358/293 |
| 4,581,761 | 4/1986 | Ichinokawa et al. | 382/59 |
| 4,620,233 | 10/1986 | Ogawa et al. | 358/293 |
| 4,647,771 | 3/1987 | Kato | 340/710 |
| 4,677,494 | 1/1987 | Sue | 358/294 |
| 4,684,998 | 8/1987 | Tanioka et al. | 250/566 |
| 4,686,329 | 8/1987 | Joyce | 250/237 R |

Primary Examiner—Edward P. Westin
Assistant Examiner—Khaled Shami
Attorney, Agent, or Firm—Rosenblum, Parish & Bacigalupi

[57] ABSTRACT

An optical scanning device (14) receives information from a page (11) of printed text (12) via an electrooptical transducer (16) and uses that information to fill a bit map in a memory device (102). In order to track the location of the optical scanner relative to the printed page, thus facilitating entry of information into the bit map, an optical mouse (19) is included in the scanner. In accordance with another embodiment of this invention, two optical mice (19, 150) are provided on the scanner (148) to indicate not only the position of the scanner relative to the page but also the angle that the scanner is held at relative to the page. The scanner can be used in conjunction with an optical character recognition device, a photocopying device, or any of a number of other devices. In accordance with another embodiment of this invention, indicia of location (210) are placed either on a transparent sheet or a mechanical constraint (200). A set of sensors (208) on an optical scanner (202) are adapted to sense this indicia but the sensors are spaced differently from the indicia, therefore indicating movement with very fine resolution.

4 Claims, 6 Drawing Sheets

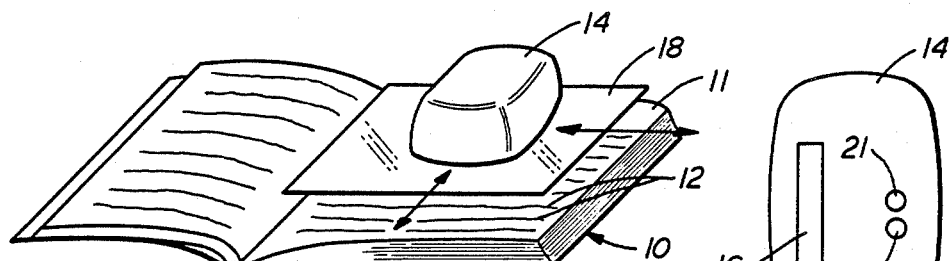
FIG._1.
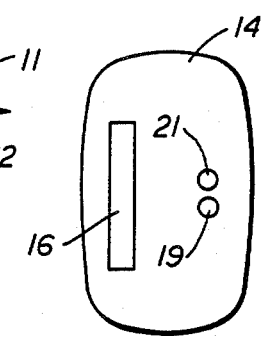
FIG._2.
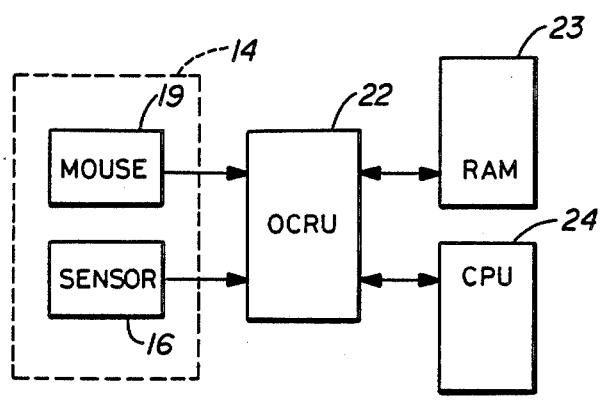
FIG._3.
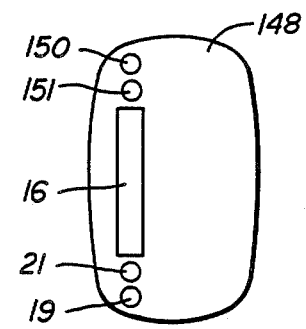
FIG._6.
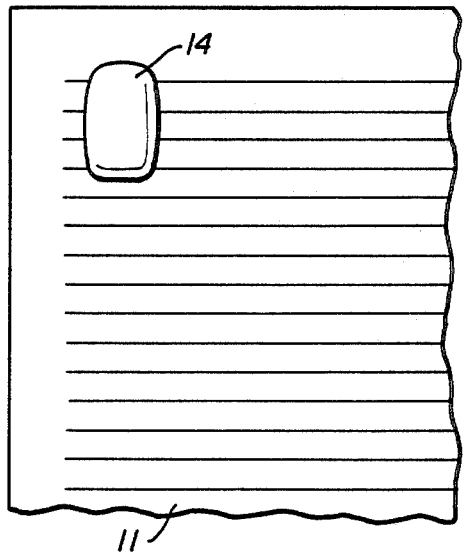
FIG._5a.
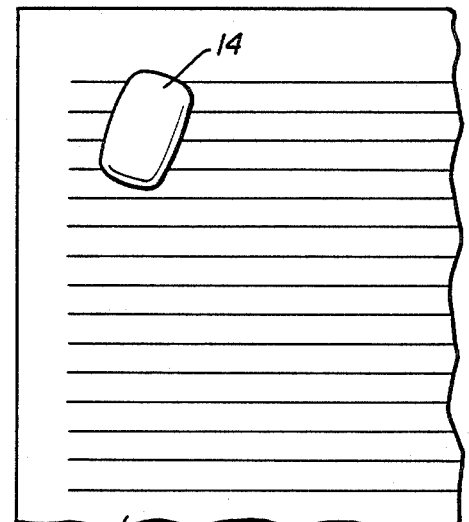
FIG._5b.

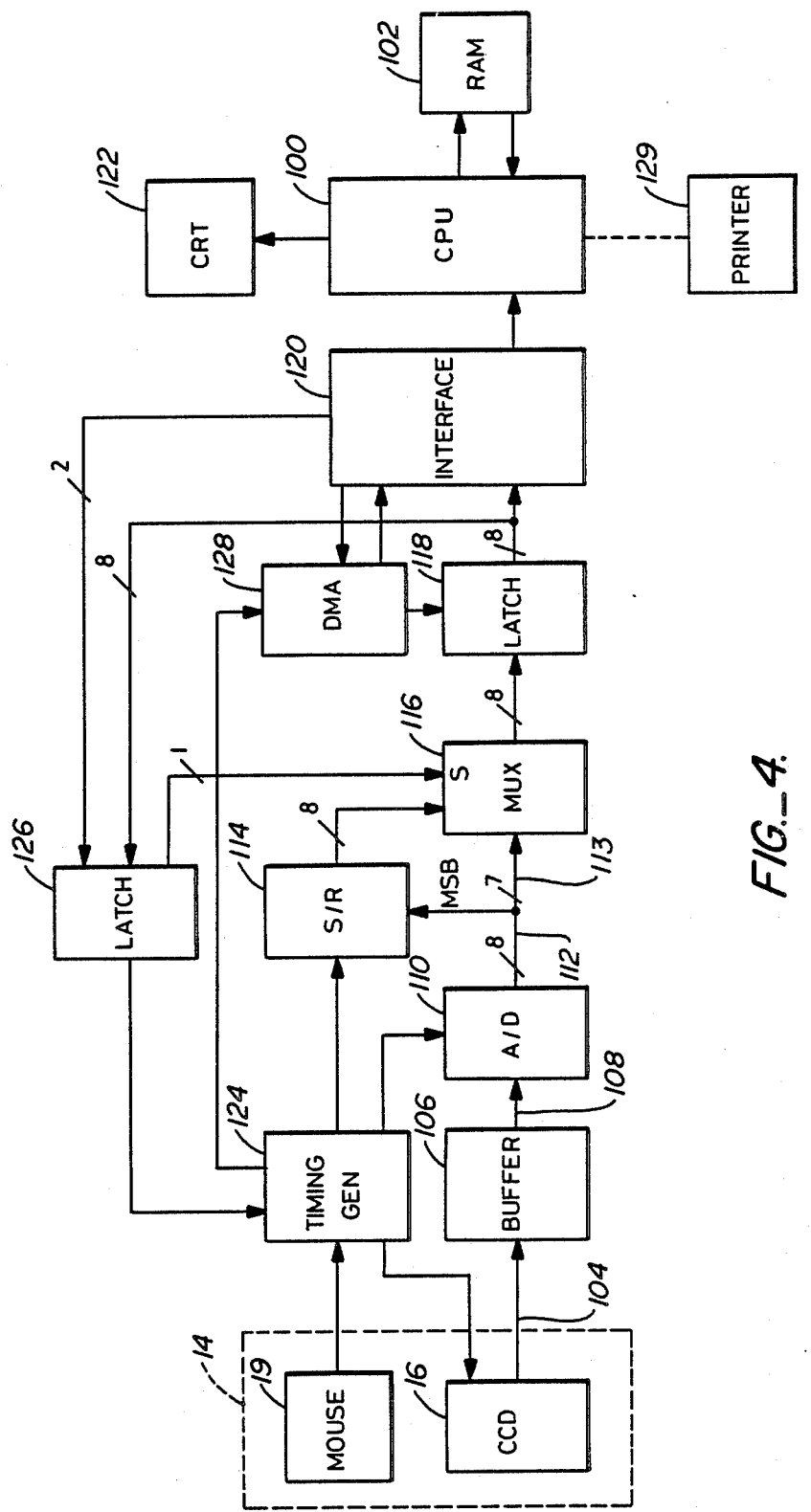
FIG._4.

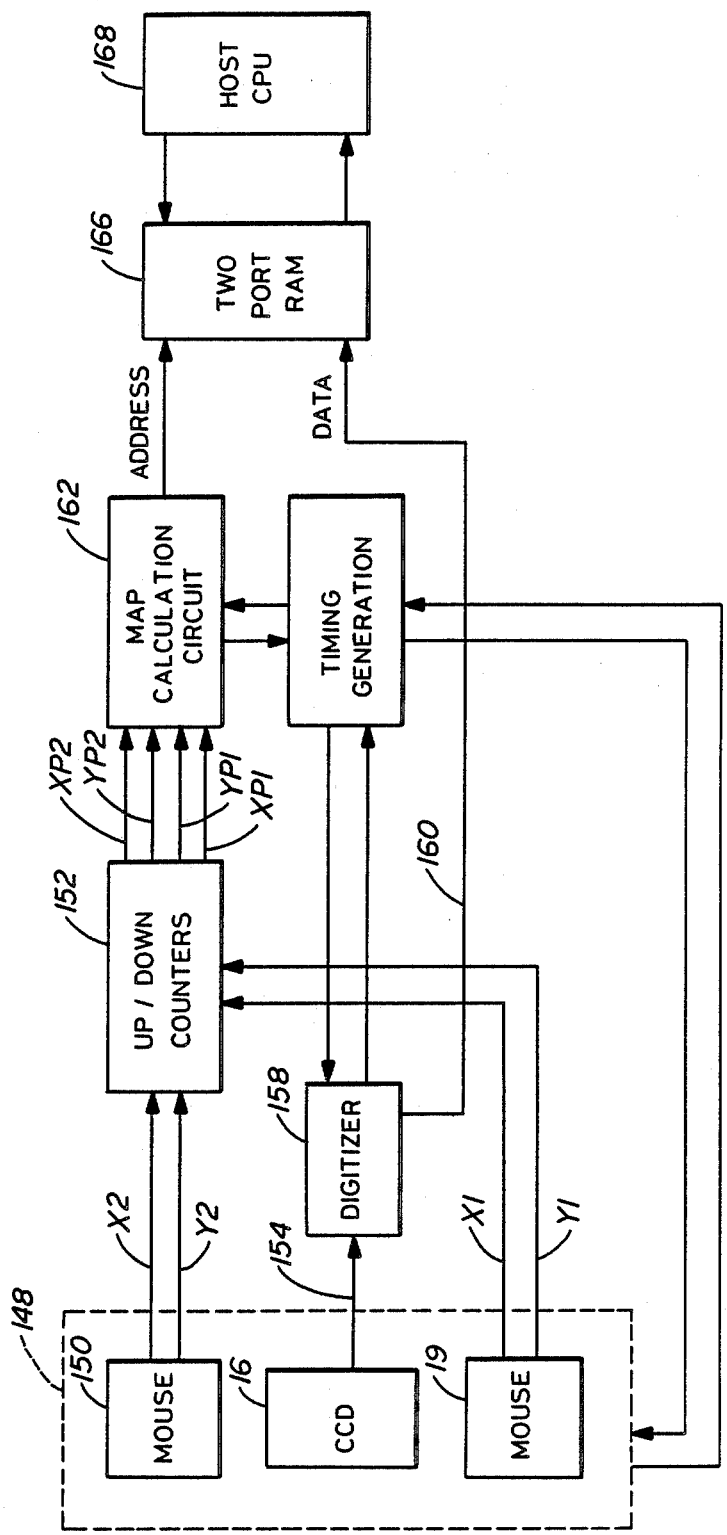
FIG._7.

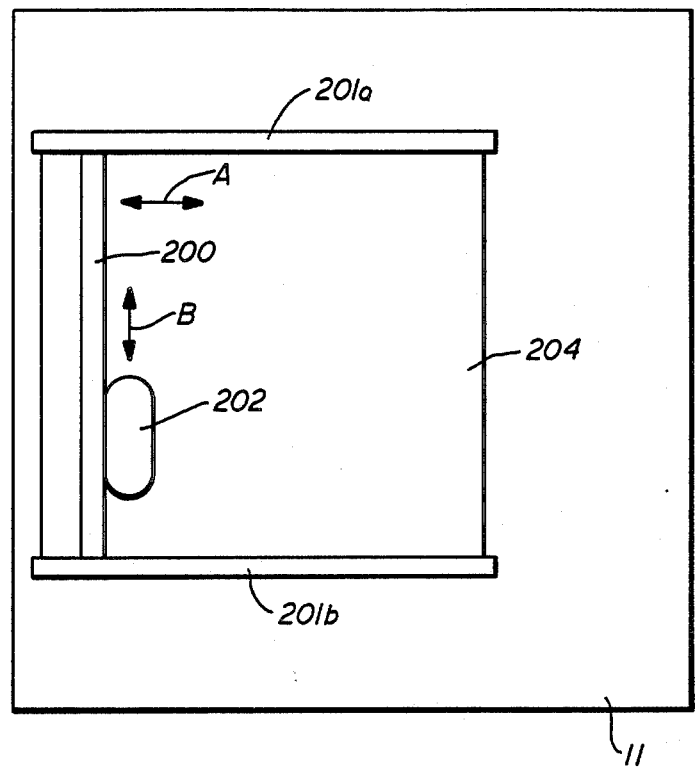
FIG._8a.
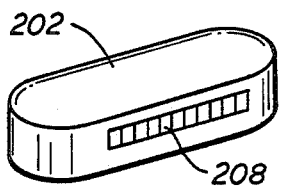
FIG._8b.
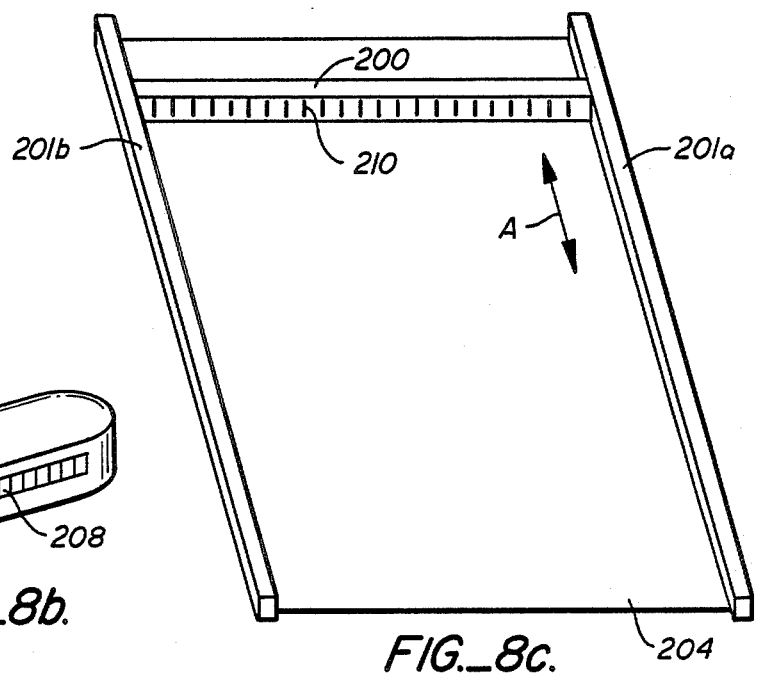
FIG._8c.

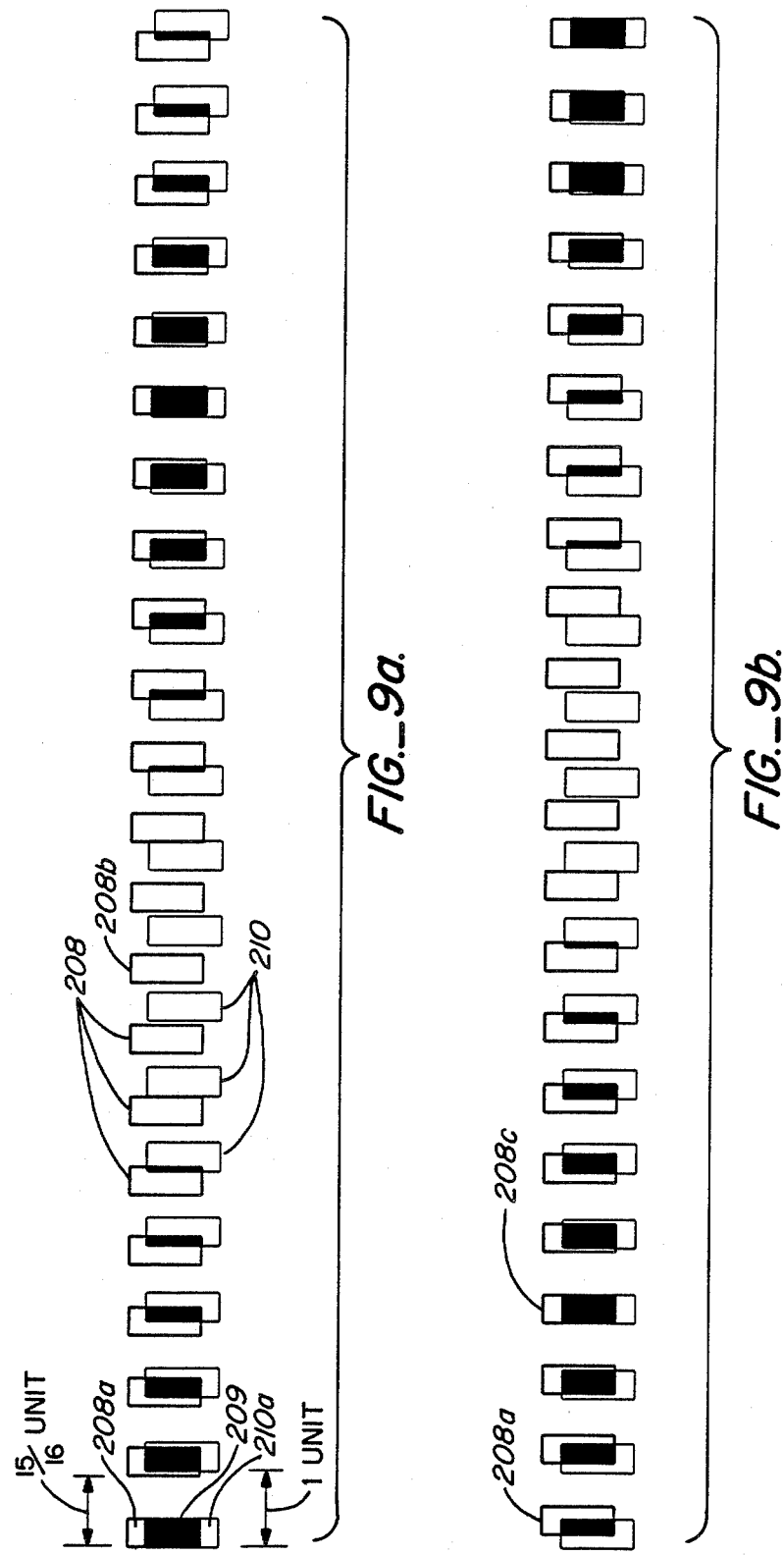
FIG._9a.
FIG._9b.

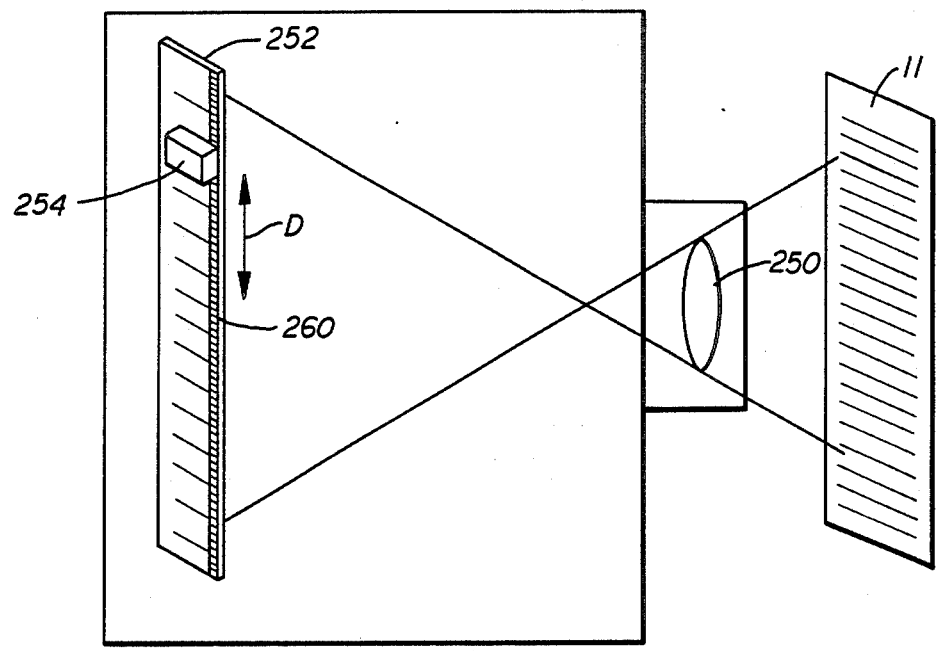
FIG._10.
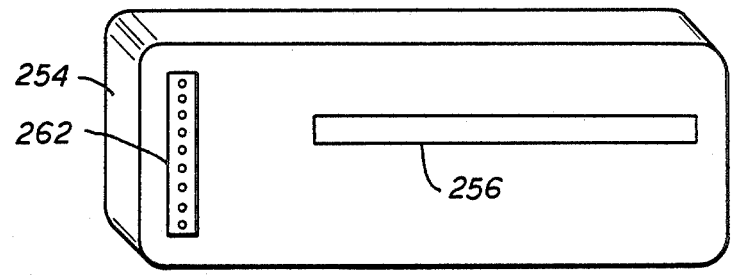
FIG._11.
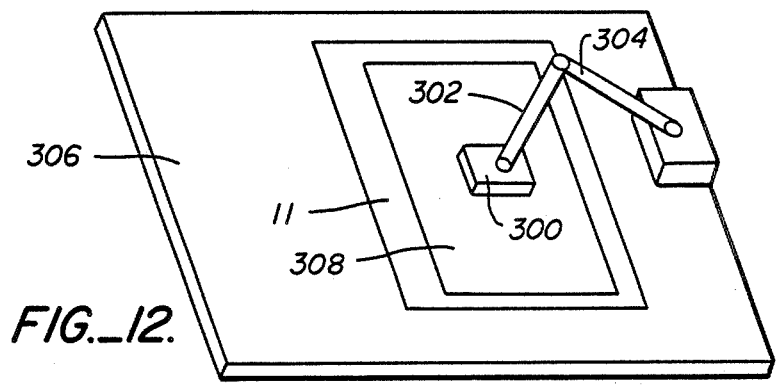
FIG._12.

OPTICAL SCANNER INCLUDING POSITION SENSORS

BACKGROUND OF THE INVENTION

1. Field of the Invention

This invention relates to optical scanners and more particularly to optical scanners using sensors for determining scanner position.

2. Description of the Prior Art

It is known in the art to use optical scanning devices in a variety of applications. For example, U.S. Pat. No. 4,088,981 issued to Stephen Gott discusses a hand-held optical scanner used in conjunction with an optica character recognition unit (OCRU) which scans characters across a page as a means for entering data into a computer. U.S. Pat. No. 4,240,748 issued to Blanc, et al. discusses another type of hand-held optical scanner used with an OCRU. These scanners typically include an array of photosensors which detect dark and light portions of a page and therefore the presence of printed characters. The photosensors are electrically coupled to an OCRU which identifies the printed characters and enters the characters into a device such as a computer memory.

In the prior art, determining the position of an optical scanner with respect to a page is a problem which has been dealt with in a number of ways. For example, U.S. Pat. No. 3,238,501 issued to Mak, et al., suggests a mechanism whereby an optical scanner is constrained to motion along a particular path. In this way, it is necessary to track scanner position with respect to only One dimension. Other optical scanning devices require complicated software algorithms to determine the position of the scanner on the page.

SUMMARY OF THE PRESENT INVENTION

An optical scanner constructed in accordance with the present invention is moved across a page containing printed text or other information. Between the scanner and the page is an transparency containing indicia of position. In one embodiment of the invention, the position dicia is printed across the transparency in a first color, while the information on the page is printed in a second color. In this way, a position sensor sensitive to the position indicia of the first color determines the position of the optical scanner relative to the page while a second sensor sensitive to the second color (or sensitive to black print) receives the desired information from the page.

In accordance with a second embodiment of the invention, the optical scanner includes two position sensors to provide information indicating not only the position of the scanner but also the angle at which the scanner is held relative to the printed text on the page.

In accordance with another embodiment of the invention, a constraint confines the optical scanner to motion along a first axis across the page. The constraint includes a plurality of lines evenly spaced along the path of the optical scanner which serves, as position indica. The optical scanner includes an array of photosensing elements, spaced slightly differently from the plurality of lines. Because of this difference in spacing, the position of the scanner is determined with resolution that is finer than the spacing of the plurality of lines. These and other features of the invention are better understood with reference to the drawings below.

BRIEF DESCRIPTION OF THE DRAWINGS

FIG. 1 is an illustration of a page of text covered by a transparency across which an optical scanning device moves.

FIG. 2 is an illustration of the bottom of the optical scanning device of FIG. 1.

FIG. 3 is a block diagram of the optical scanning device of FIG. 1 oonneoted to an OCRU.

FIG. 4 is a block diagram of a second circuit used with the optical scanning device of FIG. 1.

FIGS. 5a and 5b are illustrations of optical scanning devices being held at first and second angles, respectively, relative to text on a page.

FIG. 6 is an illustration of the bottom of an optical scanninq device with two position sensing devices.

FIG. 7 is a block diagram of a circuit which processes electrical signals from the scanner of FIG. 6.

FIG. 8a is an illustration of an optical scanner and a constraint for confining the scanner to motion along a given direction.

FIG. 8b is a perspective view of the scanner of FIG 8a.

FIG. 8c is a perspective view of the constraint of FIG. 8a.

FIGS. 9a and 9b illustrate a set of lines spaced at a first distance and a set of sensors spaced at a second distance, thereby enabling detection of motion with enhanced resolution.

FIGS. 10 and 11 illustrate an optical scanner constructed in accordance with another embodiment of the invention.

FIG. 12 is an illustration of an optical scanner affixed to a pair of movable arms which keep the scanner at a specific angle relative to a surface.

DETAILED DESCRIPTION

An optical scanner constructed in accordance with the present invention includes a plurality of photosensitive elements for receiving an imaqe, e.g., text or a picture formed on a surface. The scanner also includes a sensor which monitors the position of the scanner relative to the surface. ln this way, a device receiving signals from the scanner (e.g., a computer, OCRU, etc.) receives signals indicative of both the image formed on the surface and where on the surface that image is located.

In one embodiment of the invention, two sensors monitor the position of the scanner and provide information indicating the angle at which the scanner is held. In other embodiments, the scanner is constrained to a particular angle relative to the image by a mechanical constraint.

Referring to FIG. 1, a book 10 includes a page 11 with printed text 12 thereon. It is desirable to be able to enter text 12 from book 10 into an electronic device such as a computer without having to type the text on a keyboard. Therefore, an optical scanning device 14 constructed in accordance with one embodiment of the present invention is provided which includes a photoelectric sensor 16 (FIG. 2). Photoelectric sensor 16 scans text 12 and provides electrical output signals in response thereto. Photoelectric sensor 16 can be any of a number of devices. In one embodiment of the invention, photoelectric sensor 16 is a CCD array device such as model number Tc103-1 available from Texas Instruments. In an alternative embodiment of the invention, a dynamic RAM is used to sense light from page 11 as discussed in U.S. Pat. No. 4,344,091 issued to Gardener, et al., which is incorporated herein by reference. (Gardener discusses a dynamic RAM used as a photoelectric sensor. Light is permitted to strike the cells of the dynamic RAM, thus selectively changing the states of cells in the dynamic RAM in response to the position of those cells relative to printed text). Other types of photosensing devices can be used as well.

It is also desirable to have information corresponding to the position of optical scanning device 14 relative to page 11. Accordingly, a transparency 18 is provided between optical scanning device 4 and page 11. Transparency 18 has printed thereon position indicia which is sensed by an optical mouse mechanism 19.

In one embodiment of the invention, optical mouse mechanism 19 is of the type discussed in U.S. Pat. No. 4,364,035, issued to Steven T. Kirsch on Dec. 14, 1982 and incorporated herein by reference. In such a mechanism, transparency 18 has a set of evenly spaced horizontal lines of a first color, e.g., red, and a set of evenly spaced vertical lines of a second color, e.g., green. A sensor within mouse mechanism 19 senses when optical scanner 14 moves across the green and red lines. The number of lines crossed during a scanning operation is then-added to determine the position of optical scanner 14 with respect to transparency 18. A light source 21 provided on the bottom of optical scanning device 14 alternately provides red and green light to enable mechanism 19 to separately detect the red and green lines. (In an alternative embodiment, page 11 includes the horizontal and vertical lines as well as text 12, thus obviating the need for transparency 18.)

Referring to FIG. 3, photoelectric sensor 16 senses text 12 on page 11 and generates electrical signals in response thereto, which are communicated to an optical character recognition unit (OCRU) 22. In addition, OCRU 22 also receives signals from optical mouse mechanism 19 indicative of the position of scanning device 14. OCRU 22 performs any of a number of optical character recognition algorithms to identify characters being scanned. In one embodiment, as OCRU 22 receives signals indicative of the presence of print at a particular point on page 11 as well as information indicating the position of that point, OCRU 22 uses this information to construct a bit map in a memory device 23. (The bit map is an array of data bits, each corresponding to an area of page 12. If text is printed on an area corresponding to a given data bit, that data bit assumes a state indicative of the presence of printed text. Otherwise, the given data bit assumes the opposite state.) OCRU 22 then uses either a template matching algorithm, e.g.; as described in U.S. Pat. No. 3,165,718, issued to Harold Fleisher (incorporated herein by reference), or a feature extraction algorithm, e.g., as described in U.S. Pat. No. 4,193,056, issued to Morita, et al., (incorporated herein by reference) to identify the character scanned, and presents data corresponding to the identified character to a computer 24. In one embodiment of the invention, computer 24 is an IBM personal computer, although other computers are also appropriate.

FIG. 4 is a block diagram of another embodiment of the invention using optical scanning device 14 to fill in a bit map array within a memory device 102. In this embodiment, the circuit illustrated merely fills in the bit map array and does not necessarily perform any optical character recognition. In FIG. 4, photoelectric sensor 16 is a CCD device which includes an array of approximately 2,000 photosensitive cells arranged along a one inch line segment. CCD device 16 provides an analog output signal on a line 104, serially indicating the amount of light received by each photosensitive cell within CCD device 16. The analog signal on line 104 is presented to a buffer circuit 106 which removes an offset voltage inherent in the output signal on line 104. Circuit 106 then provides an output signal on a line 108 to an analog to digital converter 110. Analog to digital converter 110 provides an 8 bit digital output signal on an 8 bit bus 112 indicative of the amplitude of the signal received on line 108 which in turn is indicative of the amount of light which strikes the photosensitive cell within CCD device 16.

The data on bus 112 is then presented to a host computer 100 in one of two modes. In a first mode, if scanner 14 is being used to scan text printed in black and white, then the most significant bit on bus 112, which indicates whether a photosensitive cell scanned a white portion of the page or a blaok portion of the page, is presented to a shift register 114. Shift reqister 114 accumulates 8 bits of data corresponding to the most significant bits generated in response to light received by eight photosensitive cells within CCD device 16 and presents those 8 bits to a multiplexer 116. The output signals from multiplexer 116 are stored in a latch 118 which is coupled through an interface circuit 120 to computer 100. Computer 100 stores data from latch 118 in the bit map array within memory 102 and display the information stored therein on a high resolution monitor such as a CRT 122.

In a second mode of operation, multiplexer 116 transfer the seven least significant bits of data from bus 112 via latch 118 and interface circuit 120 to computer 100. In addition, shift register 114 aooumulates the most significant bits of data from bus 112, and multiplexer 116 periodically transmits these output signals from shift register 114 to latch 118. In this way, information corresponding to the scanned image includes information indicative of the relative intensity of light received by each of the photosensitive elements within CCD device 16. An image is provided to CRT 122 which indicates the relative intensity of the various shades of gray received by the photosensitive elements within CCD device 16.

Also illustrated in FIG. 4 is a timing generator 124 which provides clock signals to CCD device 16. As is well known in the art, CCDs are analog shift registers and therefore require a series of clock pulses to shift the information out of the CCD and into buffer 106. Timing generator 124 is also coupled to shift register 114 and to analog to digital converter 110 to synchronize operation of these devices with the shifting of data out of CCD device 16. Timing generator 124 also receives output signals from mouse 19. Every time mouse 19 encounters an indicia of position, e.g., one of the vertical or horizontal lines formed on transparency 18 (FIG. 1), mouse 19 provides an output signal to timing qenerator 124 which in turn causes CCD device 16 to provide output signals indicative of the state of each photosensitive cell in the CCD on line 100. Also illustrated in FIG. 4 is an exposure me and mode selection latch 126 which controls the exposure sequence for the cells in CCD device 16 as well as the mode of operation as previously discussed. In addition, a DMA handshake circuit 128 is provided which controls the flow of information between latch 118 and interface circuit 120.

In another embodiment of the invention, computer 100 is a microprocessor. Computer 100 stores data provided by scanner 14 in memory 102. Computer 100 is subsequently coupled to a dot matrix printer 129 which provides a hard copy of the page scanned by scanner 14. In this way, for example, a person can copy pages from a book by scanning those pages. The information scanned is stored in memory 102, and at a convenient time is printed on paper by printer 129. In this way a user need not carry books to a photocopy machine when it is desired to copy a page. Depending on the size of memory 102 and the resolution of printer 129, photographs as well as text can be copied by scanner 14.

Because optical scanning device 14 is a hand held device, it is possible to tilt optical scanning device 14 at an angle relative to text 12 while scanning the information on page 11. If that happens, a slightly inaccurate bit map is stored by computer 100 in memory 102. For example, if the optical scanning device 14 is held at a first angle, CCD device 16 will be oriented vertically as illustrated in FIG. 5a and a photosensitive cell at the top of CCD device 16 will sense the presence of text at a position different from the position sensed by that cell if optical scanning device 14 were held at a differeht angle, e.g., as illustrated in FIG. 5b. Because of this, in accordance with a second embodiment of the invention as shown in FIG. 6, a scanning device 148 includes a second mouse 150 and a second light source 151 to provide the host computer with information indicative of the orientation of scanning device 148. Referrinq to FIG. 6, mouse 19 and mouse 150 each provide electrical pulses indicative of their travel across indicia on transparency 18. In this way,, the host computer tracks the position of mouse 19 and mouse thereby determines the angle at which 150, and scanner 14 is held. In this way, as CCD device 16 provides a signal indicative of the light received from a givin photosensitive cel, computer 100 more accurately calculates whioh bit map position that signal corresponds to.

FIG. 7 is a block diagram of a circuit used to monitor the positions of mouse 19 and of mouse 150. Mouse 19 provides a series of pulses on a line Xl indicative of mouse 19 crossing one of the vertical lines on transparency 18. Similarly, mouse 19 provides pulses on a line Yl indicative of mouse 19 crossing one of the horizontal lines on transparency 18. Mouse 150 provides similar pulses on a line X2 and on a line Y2. These pulses are received by a set of four up down counters 152 which determine the position of mice 19 and 150 in response thereto and communicate the X and Y position of each mouse on buses XP1, XP2, YP1 and YP2. Every time a "mouse event" occurs (i.e., one of mice 19 or 150 crosses a horizontal or vertical line) CCD device 16 provides a series of output signals on a line 154 to digitizer 158 which in turn provides a series of digital output pulses on a line 160. As each pulse (indicative of the information received by an associated photosensitive cell within CCD device 16) is provided on line 160, a map calculation circuit 162 calculates the position (i.e., X and Y coordinates) of that photosensitive cell, calculates the RAM 166 pixel address corresponding to that position, and provides that address to a memory 166. (A pixel is a bit or a word of bits within a bit map array.) The contents of memory 166 are then read by a host computer 168.

In another embodiment, instead of providing signals on a single line 160, digitizer 158 provides data signals on a bus comprising several lines in order to indicate various shades of gray sensed by the sensing elements of CCD device 16.

It is possible that not all of the pixels in memory 166 may be filled after scanner 148 scans a portion of page 11. Accordingly, in one embodiment, computer 168 fills in empty pixels by averaging the values stored in memory 166 corresponding to the surrounding pixels.

Referring to FIG. 8a, another embodiment of the invention includes a constraint 200 along which an optical scanner 202 moves. constraint 200 is affixed to a pair of supports 201a, 201b, which can be-adjusted to enable constraint 200 to slide in a direction indicated by arrow A relative to supports 201a, 201b. Supports 201a, 201b are affixed to transparency 204 which is placed on page 11. Constraint 200 includes indicia of position 210 (FIG. 8c). Optical scanning device 202 includes a plurality of sensors 208 along one edge (FIG. 8b) for sensing indicia 210. As optical scanning device 202 moves along constraint 200 in a direction indicated by Arrow B, sensors 208 receive information corresponding to the position of scanning device 202 and provide that information to a computer or OCRU as described above along with the information scanned from page 11. (In another embodiment, indicia. 210 are formed on supports 201a, 201b, and scanner 202 slides along supports 201a or 201b in the direction of arrow A. Constraint 200 keeps scanner 202 vertically oriented.)

In one embodiment of the invention, indicia 210 are a set of parallel lines evenly spaced along constraint 200. A plurality of sensors 208 are spaced slightly differently than lines 210. Because of this, a pattern is created which enhances the resolution achieved by sensors 208. This can best be understood with reference to FIGS. 9a and 9b.

Referring to FIG. 9a, lines 210 are indicated by the lower set of boxes while sensors 208 are indicated by the upper set of boxes. Lines 210 are spaced such that the distance between the centers of adjacent lines is 1 distance unit, while the distance between the centers of adjacent sensors 208 is less than 1 unit, e.g., 15/16 units. When a sensor, e.g., sensor 208a is aligned with line 210a, it receives a minimum amount of light, as indicated by black square 209. When a sensor such as sensor 208b is completely misaligned from any of lines 210, it receives a maximum of light.

Referring to FIG. 9b, if scanner 202 is moved roughly 3/16 units with respect to lines 210, instead of sensor 208a receiving a minimum amoint of light, now sensor 208c receives a minimum amount of light. Thus, even though lines 210 are spaced one per distance unit and sensors 208 are spaced one per 15/16 distance unit and sensors 208 can be used to detect movement with a much finer resolution, in the case of FIG. 9b, 3/16 distance units. Thus, in accordance with one embodiment of the invention, indicia 210 are spaoed differently from sensors 208 to enhance resolution of motion. A similar technique can be employed with the indioia on transparent 18 in the previously discussed embodiments. In such an embodiment, instead of using a single mouse 19 (FIG. 2), a plurality of sensors is provided spaced along horizontal and vertical axes and spaced differently from the horizontal and vertical lines on transparency 18 in order to detect motion of scanner 14 with high resolution.

Referring to FIG. 10, another embodiment of this invention uses a lens 250 to focus an image of page 11 onto a screen 252. An optical scanner 254 detects the image on screen 252 and provides data indicative of that image to a host computer (not shown). Figure 11 illustrates the side of scanner 254 facing screen 252. Scanner 254 includes a linear CCD array 256 which is moved in a direction indicated by arrow D (FIG. 10) relative to screen 252. A set of regularly spaced lines 260 are placed on one side of screen 252. A set of position sensors 262 in scanner 254 senses the motion of scanner 254 relative to lines 260 on screen 252. In this way, accurate information indicative of the position of scanner 254 relative to screen 252 is provided to the host computer. In one embodiment, lines 260 are spaced at intervals different from the spacing of sensors 262. In this way, enhanced resolution is achieved in the same manner as with the above-described lines 210 and sensors 208. In one embodiment of this invention, after an image is focused on screen 252, scanner 254 is moved in the directions indicated by arrow D by an electromechanical device such as a motor (not shown) controlled by the host computer.

In accordance with another embodiment of this invention, an optical scanner 300 (FIG. 12) is affixed to a first movable arm 302 which is affixed to a second movable arm 304. Movable arms 302 and 304 are designed so that optical scanner 300 aways remains at the same angle relative to a surface 306 as it moves across surface 306. This is done using mechanical apparatus that is common in conventional drafting tables. On surface 306 is a transparency 308 which includes indicia of position. In this way, scanner 300 can be used in conjunction with a conventional drafting table to receive information on page 11 supported on surface 306.

In alternative embodiments of the invention, instead of using a mouse having electrooptical sensors, other types of mice, such as an electromechanical mouse can be used. Electromechanical mice typically include an upside down trackball which contacts a surface. As the mouse moves across the surface, the trackball rotates. This rotation is sensed, e.g., by using the apparatus discussed in U.S. Pat. No. 4,496,936, issued to Dan Kramer, which is incorporated herein by reference.

While the invention has been taught with reference to specific embodiments, those skilled in the art will recognize that changes can be made in form and detail without departing from the spirit and scope of the invention. Accordingly, all such changes come within the scope of the present invention.

We claim:

1. Image scanning apparatus comprising:
   first means including at least one photosensitive element movable across a surface for scanning, in any selected direction parallel to said surface, information displayed on or beneath said surface and for developing information signals commensurate therewith; and
   second means including optical detector means having first and second optical detectors spaced a predetermined distance apart from each other and having a predetermined positional relationship to said first means, for detecting optically detectable indicia of location fixedly disposed with respect to said surface and responsively providing data signals indicative of changes in the location and orientation of said first means relative to said surface.

2. Apparatus for scanning a surface displaying information, said apparatus comprising:
   a transparency including optically detectable indicia of location and adapted to cover, and to extend said indicia over siad information on, at least a portion of said surface; and
   an image scanner adapted to be moved across said transparency in any selected direction parallel to said surface and including
      at least one photosensitive element for sensing light emanating from said surface through said transparency and for developing information signals corresponding to said information, and
      means including first and second detectors for optically detecting said indicai of location and, in response thereto, providing data signals indicative of the location and orientation of said image scanner relative to said transparency.

3. The apparatus of claim 2 wherein said indicia includes a first set of parallel lines of a first color and a second set of parallel lines of a second color orthogonal to said first set, and wherein said means for optically detecting detects the passage of said scanner across said first and second sets of parallel lines.

4. Apparatus for sensing information patterns optically displayed on a surface, comprising:
   first and second optically detectable indicia of location means fixedly disposed at regular intervals over said surface and along respective first and second axes parallel to said surface but not parallel to each other; and scanner means free to move in all directions parallel to said surface and including: optical sensor measn for sensing information patterns displayed on said surface beneath said scanner means, and scanner location and orientation determining means including first and second location detection means fixedly disposed with respect to said optical sensor means and responsive to movements with respect to said optically detectable indicia of location means and operative to indicate the location and orientation of said optical sensor means with respect to said optically detectable indicia of location means.

* * * * *

UNITED STATES PATENT AND TRADEMARK OFFICE
CERTIFICATE OF CORRECTION

PATENT NO. : 4,797,544

DATED : January 10, 1989

INVENTOR(S) : James R. Montgomery

It is certified that error appears in the above-identified patent and that said Letters Patent is hereby corrected as shown below:

Column 1, line 33, "to only One" should read -- to only one --.

Column 1, line 44, "dicia" should read -- indicia --.

Column 1, line 52, "in accordanoe" should read -- in accordance --.

Column 1, line 52, "a seoond embodiment" should read -- a second embodiment --.

Column 1, line 61, "which serves," should read -- which serve --.

Column 1, line 62, "indica" should read -- indicia --.

Column 2, line 9, "oonneoted" should read -- connected --.

Column 2, line 16, "scanninq" should read -- scanning --.

Column 2, line 40, "imaqe" should read -- image --.

Column 3, line 12, "device 4" should read -- device 14 --.

Column 3, line 25, "then-added" should read -- then added --.

Column 4, line 13, "cell" should read -- cells --.

Column 4, line 20, "blaok" should read -- black --.

Column 4, line 29, "display" should read -- displays --.

UNITED STATES PATENT AND TRADEMARK OFFICE
CERTIFICATE OF CORRECTION

PATENT NO. : 4,797,544

DATED : January 10, 1989

INVENTOR(S) : James R. Montgomery

It is certified that error appears in the above-identified patent and that said Letters Patent is hereby corrected as shown below:

Column 4, lines 32-33, "transfer" should read -- transfers --.

Column 4, line 35, "aooumulates" should read -- accumulates --.

Column 4, lines 58-59, "qenerator" should read -- generator --.

Column 4, line 61, "100" should read -- 104 --.

Column 5, line 24, "differeht" should read -- different --.

Column 5, line 30, "Referrinq" should read -- Referring --.

Column 5, line 33, "way,," should read -- way, --.

Column 5, line 34, "position" should read -- positions --.

Column 5, line 34, "and mouse thereby" should read -- and mouse 150, and thereby --.

Column 5, line 35, "at which 150, and scanner 14" should read -- at which scanner 14 --.

Column 5, line 37, "givin" should read -- given --.

Column 5, line 37, "cel" should read -- cell, --.

Column 5, line 38, "whioh" should read -- which --.

UNITED STATES PATENT AND TRADEMARK OFFICE
CERTIFICATE OF CORRECTION

PATENT NO. : 4,797,544

DATED : January 10, 1989

INVENTOR(S) : James R. Montgomery

It is certified that error appears in the above-identified patent and that said Letters Patent is hereby corrected as shown below:

Column 6, line 10, "constraint" should read -- Constraint --.

Column 6, line 11, "be-adjusted" should read -- be adjusted --.

Column 6, line 24, "indicia." should read -- indicia --.

Column 6, line 48, "amoint" should read -- amount --.

Column 6, line 51, "unit and" should read -- units, --.

Column 6, line 57, "indioia" should read -- indicia --.

Column 6, lines 57-58, "transparent" should read -- transparency --.

Column 7, line 1, "imaqe" should read -- image --.

Column 7, line 6, "plaoed" should read -- placed --.

Column 7, line 15, "above-desoribed" should read -- above-described --.

Column 7, line 19, "suoh" should read -- such --.

Claim 2, column 8, line 16, "siad" should read -- said --.

Claim 2, column 8, line 26, "indicai" should read -- indicia --.

UNITED STATES PATENT AND TRADEMARK OFFICE
CERTIFICATE OF CORRECTION

PATENT NO. : 4,797,544

DATED : January 10, 1989

INVENTOR(S) : James R. Montgomery

It is certified that error appears in the above-identified patent and that said Letters Patent is hereby corrected as shown below:

Claim 4, column 8, line 44, "measn" should read -- means --.

Signed and Sealed this

Twentieth Day of February, 1990

*Attest:*

JEFFREY M. SAMUELS

*Attesting Officer*   *Acting Commissioner of Patents and Trademarks*